US000001362H

United States Statutory Invention Registration [19]

[11] Reg. Number: H1362

Herrmann et al.

[43] Published: Oct. 4, 1994

[54] DRIVE MECHANISM FOR ELEVATOR DOOR

[76] Inventors: Walter J. Herrmann, 275 Rich Hill Rd., Sellersville, Pa. 18960; C. Paul Herrmann, 73 Old New Rd., Warrington, Pa. 18976

[21] Appl. No.: 27,795

[22] Filed: Mar. 8, 1993

[51] Int. Cl.[5] ..... B66B 13/00; E05F 11/00

[52] U.S. Cl. ..... 187/324; 49/360

[58] Field of Search ..... 187/52 R, 54, 56, 1 R; 49/360, 362; 74/89

[56] References Cited

U.S. PATENT DOCUMENTS

| | | | |
|---|---|---|---|
| 3,431,678 | 3/1969 | Stuart, Jr. et al. | 49/360 |
| 3,670,455 | 6/1972 | Slaybaugh | 49/360 |
| 4,043,430 | 8/1977 | Kraft et al. | 187/52 R |
| 4,149,615 | 4/1979 | Kappenhagen | 187/52 R |
| 4,317,382 | 3/1982 | Riser | 74/89 |

FOREIGN PATENT DOCUMENTS

| | | | |
|---|---|---|---|
| 525606 | 11/1976 | U.S.S.R. | 187/52 R |

OTHER PUBLICATIONS

Brochure of Zero-Max, entitled "Roh'lix Linear Actuators" (Aug. 1983).

*Primary Examiner*—David Brown
*Attorney, Agent, or Firm*—William H. Eilberg

[57] ABSTRACT

An elevator car has a drive mechanism mounted in a compact housing on the upper surface of the car. The drive mechanism includes a rotatable drive shaft, around which is mounted a linear actuator block having a plurality of ball bearings, obliquely arranged relative to the shaft, and firmly touching the shaft. Rotation of the shaft by a motor makes the block move linearly along the shaft. A bracket attached to the block carries an elevator door. Rotation of the shaft therefore opens and closes the door. The direction of movement of the block, and hence the door, depends on the direction of rotation of the shaft. The drive mechanism is compact and simple, and can be applied to new elevators or can be used to retrofit existing elevator cars.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRIVE MECHANISM FOR ELEVATOR DOOR

BACKGROUND OF THE INVENTION

This invention relates to the field of elevators, and, in particular, provides an elevator car having an improved mechanism for controlling the elevator door.

The elevator doors of the prior art are powered by a motor mounted above the elevator car. An elaborate set of pulleys and linkages provides a connection between the motor and the door. In commercial elevators, there are generally two doors, an inner door and an outer door.

The arrangement used in commercial elevators of the prior art is not economical for use in residential elevators. The components of the elevator are heavy and bulky. In the event of a power failure, it is very difficult to open the elevator door.

Elevators used in residential environments are generally smaller and simpler than their commercial counterparts. There is a need for a simple, reliable, and relatively inexpensive drive mechanism for the door. The present invention provides such a mechanism. With the elevator door of the present invention, one can easily open the door manually in the event of a power failure. The construction of the elevator door of the present invention is simple, comparatively inexpensive, and safe.

The door mechanism of the present invention also has the advantage that it is highly modular, and can be used to retrofit existing elevators having a variety of configurations. The present invention is sufficiently compact for use in a residential elevator, but it could also be used in commercial applications.

SUMMARY OF THE INVENTION

The present invention comprises an elevator car having a drive mechanism attached to the upper surface of the car housing. A sliding door forms one of the walls of the car. The drive mechanism includes a rotatable shaft, a motor or other means for rotating the shaft, and a block having recesses which hold a plurality of ball bearings. The ball bearings are mounted within the block at an angle such that when the block is mounted around the shaft, rotation of the shaft causes the bearings to rotate also. Due to the orientation of the ball bearings, the block moves linearly along the shaft when the bearings rotate. Reversing the direction of rotation of the shaft reverses the direction of linear movement of the block. The block carries a bracket to which is attached one end of the sliding door of the elevator car. Thus by rotating the shaft, one opens and closes the sliding elevator door.

In the preferred embodiment, all the elements of the drive mechanism are contained within a single drive housing. These elements include the motor which drives the shaft, a belt and pulley connecting the motor to the shaft, and an electronic control module which governs the operation of the motor and thus controls the movement of the door. Due to its modular construction, the present invention can be used to retrofit existing elevator cars with the new drive mechanism. Also, it can be easily installed as original equipment with a minimum of expense and effort.

The present invention therefore has a primary object of providing an improved drive mechanism for an elevator door.

The invention has the further object of providing a drive mechanism which reduces the cost and complexity of an elevator door.

The invention has the further object of providing a door drive mechanism which is especially desirable for use in residential elevators.

The invention has the further object of providing a drive mechanism for an elevator door, which mechanism can be easily installed on existing elevators.

The invention has the further object of providing an elevator door drive mechanism of modular construction.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
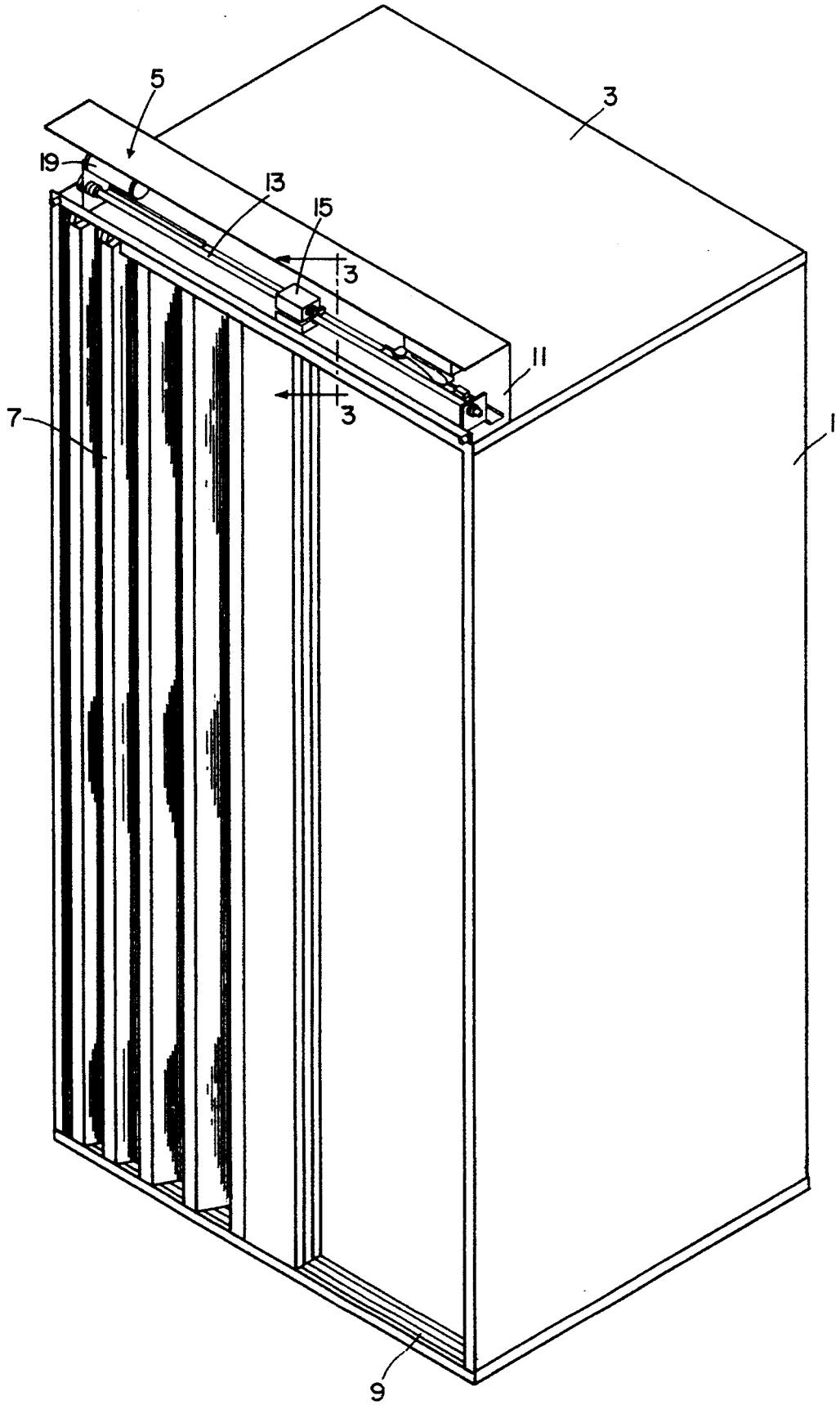
FIG. 1 provides a perspective view of an elevator car of the present invention, with the drive mechanism affixed to the upper exterior surface of the car.

FIG. 1 shows a perspective view of an elevator car made according to the present invention. The elevator car includes housing 1 having an upper surface 3. Drive mechanism 5 is mounted to the upper surface of the housing. An elevator door 7 forms one wall of the elevator car. In the embodiment shown in FIG. 1, the door comprises a plurality of articulated panels which fold in a zig-zag manner when the door is opened. The door panels slide within track 9, and also within a similar track, not visible in FIG. 1, near the upper portion of the car. Note that the invention can be practiced with many other kinds of sliding doors, and is not limited to the particular folding and sliding door shown in FIG. 1.

Figure 2:
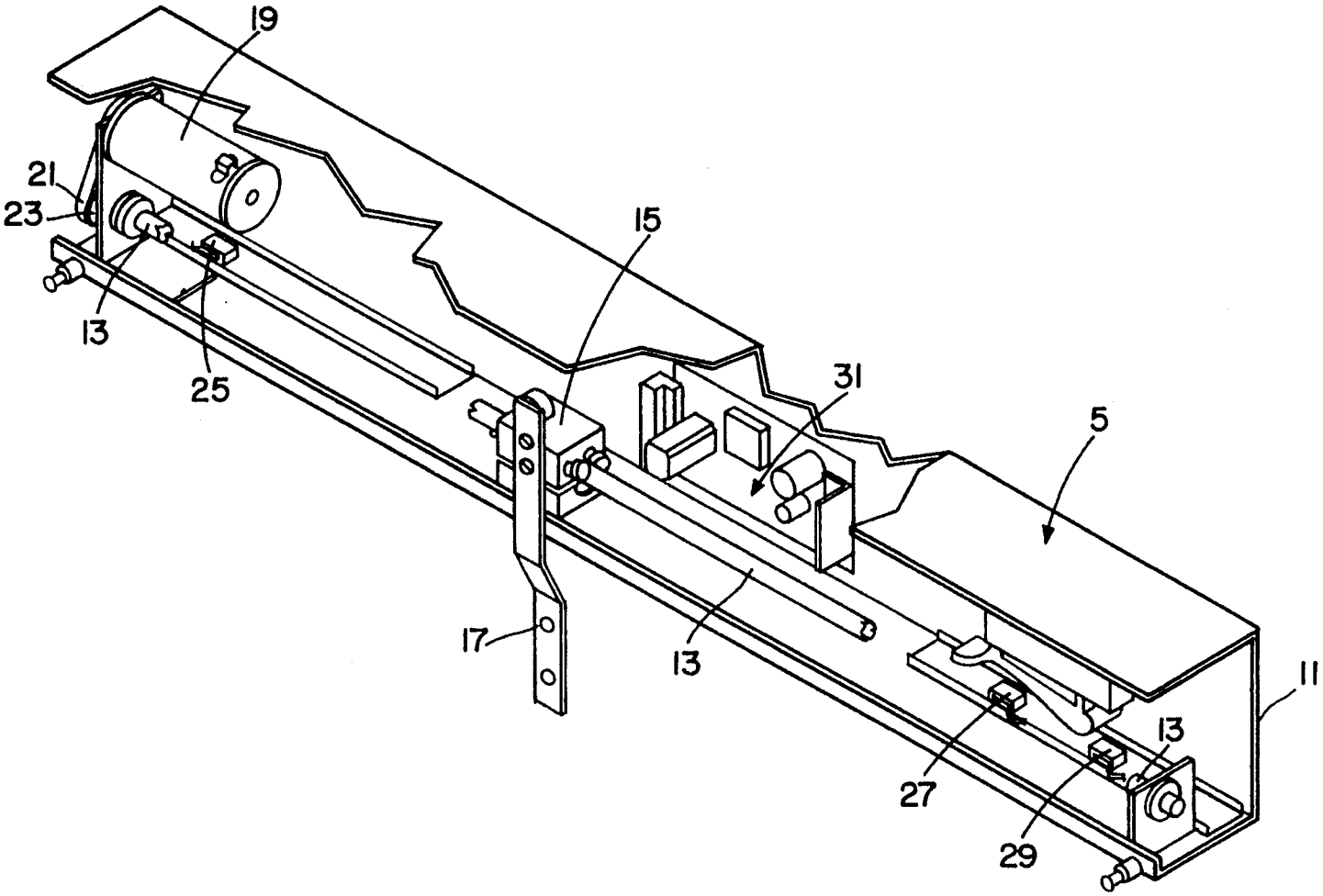
FIG. 2 provides a perspective view of the drive mechanism for the elevator car.

The drive mechanism 5 can be best understood with reference to the perspective view of FIG. 2, which shows the drive mechanism without the elevator car. All of the components of the drive mechanism are contained within drive housing 11, which shields the working components from view. A rotatable shaft 13 extends substantially across the width of the car. FIG. 2 shows the shaft in fragmentary form, so as to illustrate the other components; FIG. 1 shows substantially the entire shaft. Linear actuator block 15 fits around shaft 13 and moves along the shaft, in a manner to be described. Bracket 17 is attached to block 15. The other end of the bracket can then be attached to the elevator door.

Motor 19 causes rotation of shaft 13, by means of belt 21 and pulley 23. Any motor can be used, provided that it is reversible, so that shaft 13 can be made to rotate in both directions. Limit switches 25, 27, and 29 are actuated by a suitable cam (not shown) attached to block 15. Actuation of limit switch 25 indicates that the elevator door is open. Actuation of limit switch 29 indicates that the door is closed. Actuation of limit switch 27 indicates that the door is nearly closed and provides a signal that can be used to begin deceleration of the door. Electronic control module 31 controls the operation of the door. The control module receives inputs from the limit switches, and from suitable switches on the outside of the car indicating arrival at a particular floor.

The control module causes the door to open and close in the desired manner. For example, one can program the control module, either by software or by hardwiring, to hold the door open until receipt of a signal from the car, or from an elevator call button on another floor. When such a signal is received, the gate automatically closes, and reopens when the elevator car arrives at the selected floor.

The electronic control module can also contain various controls for setting certain parameters of operation. For example, one can set the speed at which the elevator door opens, the speed at which it closes initially, and the speed to which it decelerates when the door is nearly fully closed. As a safety feature, the door can also be programmed to open when an obstruction (such as a person or a hand) is detected in the path of the closing door. One can control the amount of time the car door will remain open after it reopens upon detection of such an obstruction. Also, one can control the amount of obstructive force which the closing door must detect before it will abandon its attempt to close and reverse direction. Other such controls can be added; in FIG. 2, the illustration of the control module is intended to be symbolic of various control functions, all of which are preferably controlled through a single module.

Figure 3:
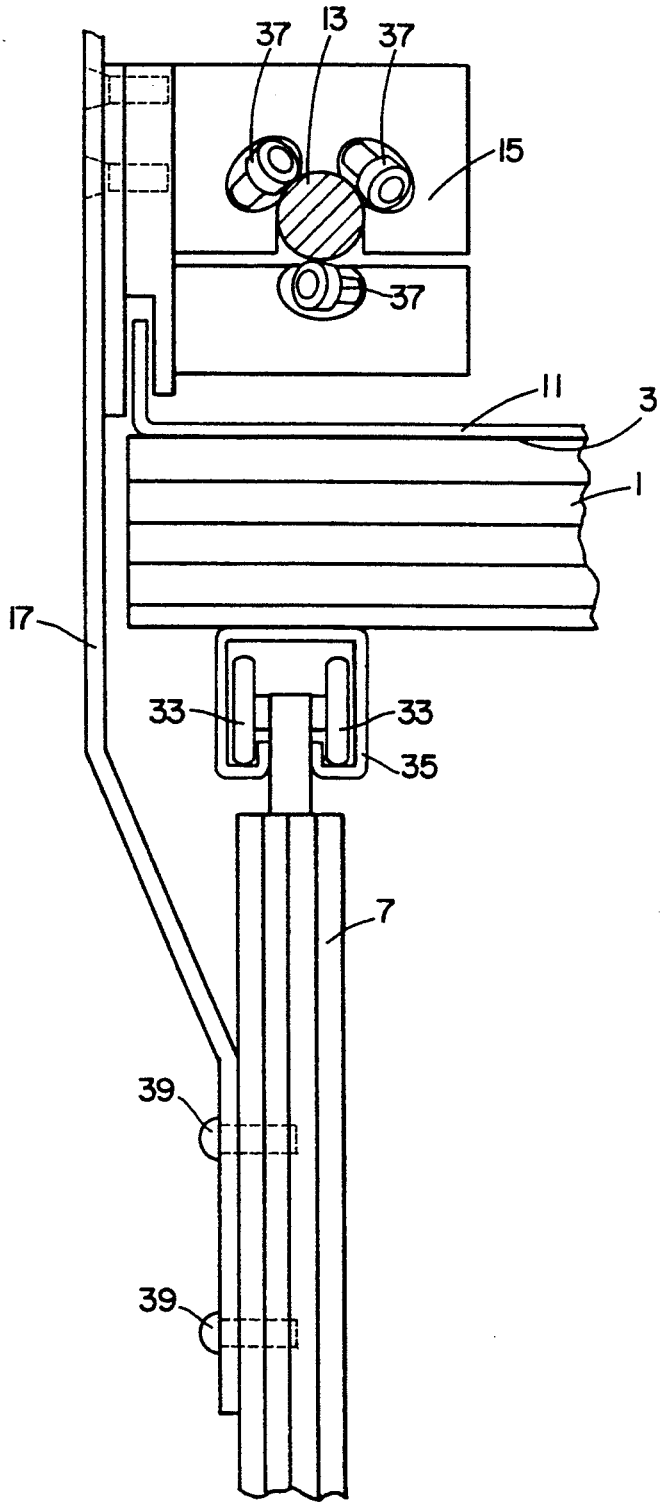
FIG. 3 provides a fragmentary cross-sectional view, taken along the line 3—3 of FIG. 1, and showing the block which carries the bracket to which the elevator door is attached, in the present invention.

FIG. 3 shows more details of the structure of the linear actuator block 15 and its connection to the elevator door. As shown in FIG. 3, the bottom portion of drive housing 11 is attached to the upper surface 3 of the elevator car housing 1. The linear actuator block 15 is attached to the drive housing by suitable bolts, and is also connected to bracket 17. The bracket is what is connected to elevator door 7. FIG. 3 shows bolts 39 which secure the bracket to the door 7. However, any other means of connection of the bracket to the door can be used. As shown in the figure, the elevator door is attached to rollers 33 which ride in track 35. Thus, in the embodiment shown, the door moves within both upper and lower tracks. The configuration of tracks can be changed, within the scope of the invention. It is possible, though not preferable, to omit the lower track entirely, for example. What is important is that the drive mechanism have an attachment to the door.

As shown in FIG. 3, block 15 defines a housing for ball bearings 37 which are arranged around shaft 13, so as to touch the shaft. The ball bearings are all disposed at an angle to the shaft, as shown. Because the ball bearings and the shaft are in firm contact, rotation of the shaft causes rotation of the bearings. Due to the oblique orientation of the bearings, rotation of the bearings generates a force having a component which is directed along the length of the shaft. The result is that when the bearings rotate, due to rotation of the shaft, the block moves linearly along the shaft. The direction of rotation of the shaft controls the direction of movement of the block along the shaft. The moving block carries with it the bracket 17, and hence the elevator door. A linear actuator of this type, i.e. a combination of shaft and actuator block, can be obtained commercially. For example, one such linear actuator is sold under the trademark Roh'lix by the Barry Wright Corporation.

The elevator made according to the present invention has important advantages over elevators of the prior art. It is economical, structurally simple, and compact. All of its components can be housed in the relatively compact drive housing 11, shown in the figures. In elevators of the prior art, the motor is generally mounted above the car, and the other components take considerably more space than that required by the present invention.

Due to the compact structure of the drive mechanism, the entire device can be sold as a self-contained module. One can retrofit an existing elevator car with the drive mechanism of the present invention, simply by mounting the drive mechanism to the car and connecting the bracket to the door. The compact structure reduces or eliminates the need for additional overhead clearances that would be necessary with elevator cars of the prior art. The present invention is advantageous also when the elevator is being manufactured as original equipment, because the same considerations mentioned above still apply.

The linear actuator drive has the advantage of simplicity and reliability, as it significantly reduces the number of belts, gears, linkages, and/or clutches that would otherwise be necessary to connect a drive motor to an elevator door. With the elevator car of the present invention, one need only provide rotational motion to a single shaft, and the elevator door moves accordingly, under the influence of friction between the rotating shaft and a set of ball bearings. Moreover, in the event of a power failure, one can easily open or close the door manually, since the ball bearings will also slide freely along the shaft. Manual opening or closing of the door cannot harm the motor, since it is necessary only to slide the bearings along the shaft, and such sliding motion does not affect the motor.

While an elevator door is closing, one needs to provide for automatic reversal in the event an obstruction is detected. The present invention makes it easy to provide for such automatic reversal. One can simply monitor the torque of the motor; when the torque exceeds a predetermined value, as would occur if an obstruction blocks the door, the controller reverses the direction of the motor and opens the door.

The above-described embodiments should not be interpreted to limit the invention. One can modify the invention in many ways. The specific shape of the elevator car and the door can be changed. The particular functions of the electronic controls can be modified. The invention can be practiced with a variety of types of doors. The only important requirement for the door is that it can be opened and closed by linear movement of a component traveling along a shaft disposed across the width of the car. These and other modifications, as will be apparent to those skilled in the art, should be considered within the spirit and scope of the following claims.

What is claimed is:

1. An elevator car comprising:

a) means defining a car housing, the housing having an upper portion, b) a drive mechanism mounted to the upper portion of the housing, the drive mechanism including a rotatable shaft, means for rotating the shaft, a block defining recesses which contain at least one rollable bearing, the bearing being fixedly mounted in the block and the block being mounted on the shaft such that rotation of the shaft causes the block to slide along the shaft, the block having a bracket attached thereto, wherein the bearing contacts the shaft with a pressure which is substantially uniform for any position of the block along the shaft, and c) a sliding door, at least a portion of the door being attached to the bracket, wherein rotation of the shaft causes opening and closing of the door.

2. The elevator car of claim 1, wherein the rotating means comprises a motor connected to the shaft by a pulley.

3. The elevator car of claim 1, wherein the rotation of the shaft is controlled by an electronic control module.

4. The elevator car of claim 1, wherein the rotating means comprises a motor connected to the shaft by a pulley, and wherein the rotation of the shaft is controlled by an electronic control module, and wherein the motor, the pulley, and the control module are all contained within a single drive housing.

5. In an elevator car, the car including a housing, a sliding door, and a drive mechanism for moving the door, the improvement wherein the drive mechanism comprises a rotatable shaft, means for rotating the shaft, a block defining recesses which contain at least one rollable bearing, the bearing being fixedly mounted in the block and the block being mounted on the shaft such that rotation of the shaft causes the block to slide along the shaft, the block having a bracket attached thereto, wherein the bearing contacts the shaft with a pressure which is substantially uniform for any position of the block along the shaft, and the door being attached to the bracket, wherein rotation of the shaft causes the door to open and close.

6. The improvement of claim 5, wherein the rotating means comprises a motor connected to the shaft by a pulley.

7. The elevator car of claim 5, wherein the rotation of the shaft is controlled by an electronic control module.

8. The elevator car of claim 5, wherein the rotating means comprises a motor connected to the shaft by a pulley, and wherein the rotation of the shaft is controlled by an electronic control module, and wherein the motor, the pulley, and the control module are all contained within a single drive housing.

9. In an elevator car, the car including a housing, a sliding door, and a drive mechanism for moving the door, the improvement wherein:

the drive mechanism is contained within a module which is removably attached to the housing, the module includes a rotatable shaft, means for rotating the shaft, a block defining recesses which contain at least one rollable bearing, the bearing being fixedly mounted in the block, the block being mounted on the shaft such that rotation of the shaft causes the block to slide along the shaft, the block having a bracket attached thereto, the bracket extending from the module, wherein the bearing contacts the shaft with a pressure which is substantially uniform for any position of the block along the shaft, and wherein the door is attached to the bracket.

10. A method of retrofitting an elevator car with a drive mechanism, the elevator car having a housing and a slidable door, the method comprising the steps of:

a) providing a module which includes a rotatable shaft, means for rotating the shaft, a block defining recesses which contain at least one rollable bearing, the bearing being fixedly mounted in the block and the block being mounted on the shaft such that rotation of the shaft causes the block to slide along the shaft, the block having a bracket attached thereto and extending from the module, wherein the bearing contacts the shaft with a pressure which is substantially uniform for any position of the block along the shaft, b) mounting the module to the housing, and c) connecting the bracket to the door.

* * * * *